(12) United States Patent
Hayashi (10) Patent No.: US 10,773,390 B2
(45) Date of Patent: Sep. 15, 2020

(54) FORCE DETECTING DEVICE, DRIVING UNIT, AND ROBOT

(71) Applicant: Seiko Epson Corporation, Tokyo (JP)

(72) Inventor: Takayuki Hayashi, Shimosuwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/713,969

(22) Filed: Sep. 25, 2017

(65) Prior Publication Data

US 2018/0093382 A1 Apr. 5, 2018

(30) Foreign Application Priority Data

Sep. 30, 2016 (JP) ................................ 2016-194054

(51) Int. Cl.
| | | |
|---|---|---|
| *B25J 13/08* | (2006.01) | |
| *B25J 9/10* | (2006.01) | |
| *G01L 1/16* | (2006.01) | |
| *B25J 9/02* | (2006.01) | |
| *B25J 9/16* | (2006.01) | |
| *B25J 19/02* | (2006.01) | |
| *G01L 5/167* | (2020.01) | |
| *G01L 5/22* | (2006.01) | |

(52) U.S. Cl.
CPC ............... *B25J 13/085* (2013.01); *B25J 9/02* (2013.01); *B25J 9/102* (2013.01); *B25J 9/1694* (2013.01); *B25J 19/028* (2013.01); *G01L 1/16* (2013.01); *G01L 5/167* (2013.01); *G01L 5/226* (2013.01)

(58) Field of Classification Search
CPC ......... G01L 5/167; G01L 5/226; G01L 13/06; B25J 13/085; B25J 9/02; B25J 9/1694; B25J 19/028; G05B 19/401

USPC .......................................... 73/777, 779, 774
See application file for complete search history.

(56) References Cited

U.S. PATENT DOCUMENTS

| | | | | |
|---|---|---|---|---|
| 4,821,584 A | * | 4/1989 | Lembke ................. | B25J 19/063 310/338 |
| 5,513,106 A | * | 4/1996 | Yoshino ............... | B62D 57/032 180/8.1 |
| 7,105,984 B2 | * | 9/2006 | Miyazawa ............. | H02N 2/004 310/323.02 |
| 7,579,758 B2 | * | 8/2009 | Maruyama ............. | G06F 3/016 310/338 |
| 8,665,123 B2 | * | 3/2014 | Taniguchi .............. | G01D 11/24 310/81 |
| 9,127,996 B2 | * | 9/2015 | Kawai .................... | B25J 13/085 |
| 9,327,409 B2 | * | 5/2016 | Asada ..................... | B25J 13/088 |
| 9,342,066 B2 | * | 5/2016 | Shimodaira .......... | G05B 19/401 |
| 9,410,856 B2 | * | 8/2016 | Kamiya .................. | G01L 1/16 |
| 9,425,712 B2 | * | 8/2016 | Shibamoto .............. | H02N 2/18 |

(Continued)

FOREIGN PATENT DOCUMENTS

| | | |
|---|---|---|
| JP | 11-014475 A | 1/1999 |
| JP | 2006-024041 A | 1/2006 |

(Continued)

*Primary Examiner* — Octavia Hollington
(74) *Attorney, Agent, or Firm* — Harness, Dickey & Pierce, P.L.C.

(57) ABSTRACT

A force detecting device includes a first member configuring a part of a driving device that performs at least one of generation and transmission of a driving force, a second member, and a piezoelectric element disposed between the first member and the second member and configured to output a signal according to an external force.

14 Claims, 9 Drawing Sheets

(56) References Cited

U.S. PATENT DOCUMENTS

| | | | |
|---|---|---|---|
| 9,476,354 B2 * | 10/2016 | Hiyoshi | F02B 75/045 |
| 9,561,585 B2 | 2/2017 | Tanaka | |
| 9,568,075 B2 * | 2/2017 | Gomi | B25J 9/1635 |
| 9,727,140 B2 * | 8/2017 | Norieda | G06F 3/041 |
| 9,751,306 B2 * | 9/2017 | Sato | B41J 2/14072 |
| 2007/0281824 A1 * | 12/2007 | Tezuka | G01D 5/04 |
| | | | 475/331 |
| 2008/0202269 A1 * | 8/2008 | Yamakawa | B62D 5/008 |
| | | | 74/422 |
| 2012/0048628 A1 | 3/2012 | Kawanami et al. | |
| 2014/0060223 A1 | 3/2014 | Tanaka | |
| 2015/0120058 A1 | 4/2015 | Karito et al. | |
| 2015/0127147 A1 | 5/2015 | Yamazaki et al. | |

FOREIGN PATENT DOCUMENTS

| | | | |
|---|---|---|---|
| JP | 2006-050710 A | 2/2006 |
| JP | 2009-058388 A | 3/2009 |
| JP | 2010-120124 A | 6/2010 |
| JP | 2012-047460 A | 3/2012 |
| JP | 2012-250320 A | 12/2012 |
| JP | 2013-113661 A | 6/2013 |
| JP | 2013-113760 A | 6/2013 |
| JP | 2013-119133 A | 6/2013 |
| JP | 2015-085455 A | 5/2015 |
| JP | 2015-089576 A | 5/2015 |
| JP | 2015-182142 A | 10/2015 |

\* cited by examiner

FORCE DETECTING DEVICE, DRIVING UNIT, AND ROBOT

BACKGROUND

1. Technical Field

The present invention relates to a force detecting device, a driving unit, and a robot.

2. Related Art

For example, in a robot including a robot arm including at least one arm, a force detecting device that detects a force is provided in a joint section of the robot arm and detects a force applied to the robot arm. In general, the robot arm is driven by a motor.

A motor with a torque sensor described in JP-A-2009-58388 (Patent Literature 1) includes a motor and a torque sensor of a strain gauge, which is an example of a force detecting device. The torque sensor is coupled to a housing of the motor.

In the motor with the torque sensor described in Patent Literature 1, since the torque sensor is separate from the motor, the dimension of each of the torque sensor and the motor greatly affects the dimension of the entire motor with the torque sensor. The motor with the torque sensor is increased in size. When the motor with the torque sensor is provided in, for example, a joint section of a robot arm, an increase in the total length of the robot arm is caused. As a result, an increase in the size of a robot is caused and a workable operation range of the robot is reduced.

SUMMARY

An advantage of some aspects of the invention is to provide a force detecting device that can achieve a reduction in the size of a unit including a force detecting device and a driving device and provide a driving unit and a robot including the force detecting device.

The advantage can be achieved by the following configurations.

A force detecting device according to an aspect of the invention includes: a first member configuring a part of a driving device that performs at least one of generation and transmission of a driving force; a second member; and a piezoelectric element disposed between the first member and the second member and configured to output a signal according to an external force.

With the force detecting device, since the first member configures a part of the driving device, compared with when the first member is configured separately from the driving device, it is possible to achieve a reduction in the size of a unit including the force detecting device and the driving device.

In the force detecting device according to the aspect of the invention, it is preferable that the piezoelectric element includes quartz.

With this configuration, it is possible to realize the force detecting device having excellent characteristics such as high sensitivity, a wide dynamic range, and high rigidity.

In the force detecting device according to the aspect of the invention, it is preferable that the force detecting device includes a plurality of the piezoelectric elements stacked in a direction in which the first member and the second member are arranged.

With this configuration, by stacking the plurality of piezoelectric elements, it is possible to achieve an increase in the sensitivity of the force detecting device and achieve an increase of detection axes. Compared with when the plurality of piezoelectric elements are stacked in a direction perpendicular to the direction in which the first member and the second member are arranged, it is possible to achieve a reduction in the size of the force detecting device. Since a direction of a load applied to the piezoelectric elements is mainly the stacking direction of the piezoelectric elements, it is possible to increase the rigidity of the entire force detecting device.

In the force detecting device according to the aspect of the invention, it is preferable that the driving device includes at least one of a motor, a reduction gear, and an encoder.

With this configuration, it is possible to integrate (unitize) the force detecting device with any one of the motor, the reduction gear, and the encoder.

In the force detecting device according to the aspect of the invention, it is preferable that the first member configures a part of the reduction gear.

With this configuration, it is possible to integrate (unitize) the force detecting device with the reduction gear.

In the force detecting device according to the aspect of the invention, it is preferable that the first member configures a part of the encoder.

With this configuration, it is possible to integrate (unitize) the force detecting device with the encoder.

In the force detecting device according to the aspect of the invention, it is preferable that the force detecting device includes a fixing member that fixes the first member and the second member to each other in a state in which the piezoelectric element is sandwiched and pressurized by the first member and the second member sandwich the piezoelectric element.

With this configuration, it is possible to reduce fluctuation in an output of the piezoelectric element in a state in which an external force is not applied (a natural state). It is possible to detect, with the piezoelectric element, external forces in both directions along a pressurizing direction.

In the force detecting device according to the aspect of the invention, it is preferable that the force detecting device includes a plurality of the piezoelectric elements disposed between the first member and the second member and configured to output a signal according to an external force.

With this configuration, it is possible to collectively pressurize the plurality of piezoelectric elements.

A driving unit according to an aspect of the invention includes: the force detecting device according to the aspect of the invention; and a driving device configured to perform at least one of generation and transmission of a driving force. The first member of the force detecting device configures a part of the driving device.

With the driving unit, since the first member configures a part of the driving device, it is possible to achieve a reduction in size compared with when the first member is configured separately from the driving device.

A robot according to an aspect of the invention includes: the force detecting device according to the aspect of the invention; and a driving device configured to perform at least one of generation and transmission of a driving force. The first member of the force detecting device configures a part of the driving device.

With the robot, since the first member configures a part of the driving device, it is possible to achieve a reduction in the size of a unit including the force detecting device and the driving device compared with when the first member is configured separately from the driving device. Therefore, it is possible to achieve a reduction in the size of the robot.

In the robot according to the aspect of the invention, it is preferable that the robot includes: a third member configured to support the driving device; and a fourth member capable of turning with respect to the third member, the driving device includes a reduction gear, the first member configures a part of the reduction gear, and the second member configures a part of the fourth member.

With this configuration, it is possible to integrate (unitize) the force detecting device with the reduction gear and the fourth member. Therefore, it is possible to achieve a further reduction in the size of the robot.

BRIEF DESCRIPTION OF THE DRAWINGS

The invention will be described with reference to the accompanying drawings, wherein like numbers reference like elements.

DESCRIPTION OF EXEMPLARY EMBODIMENTS

Preferred embodiments of the invention are explained in detail below with reference to the accompanying drawings.

First Embodiment

Driving Unit

Figure 1:
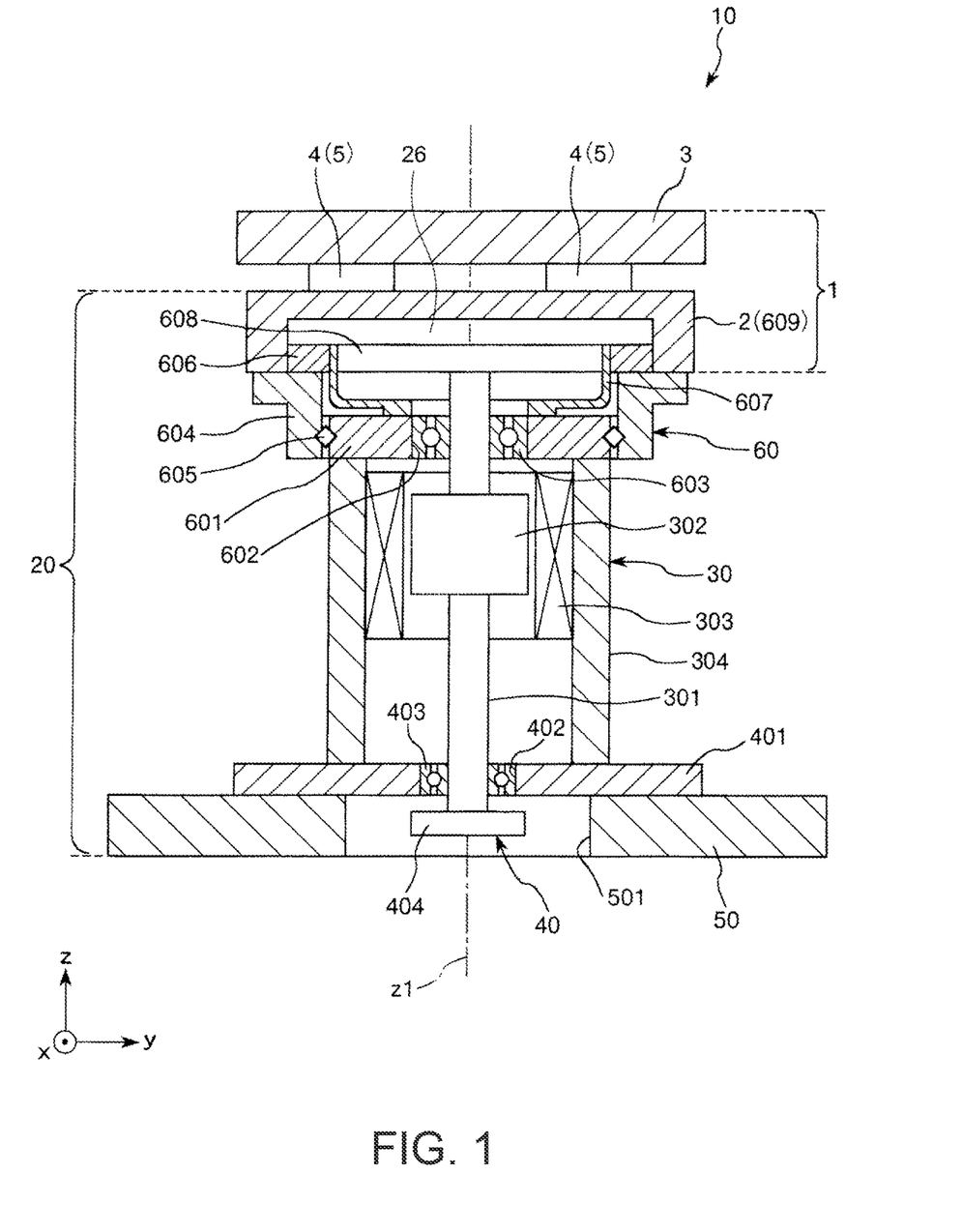
FIG. 1 is a sectional view showing a driving unit according to a first embodiment of the invention.

FIG. 1 is a sectional view showing a driving unit according to a first embodiment of the invention. Note that, in FIG. 1, for convenience of explanation, an x axis, a y axis, and a z axis are shown as three axes orthogonal to one another. Distal end sides of arrows indicating the axes are represented as "+" and proximal end sides of the arrows are represented as "−". A direction parallel to the x axis is referred to as "x-axis direction", a direction parallel to the y axis is referred to as "y-axis direction", and a direction parallel to the z axis is referred to as "z-axis direction". A +Z-axis direction side is referred to as "upper" as well and a −z-axis direction side is referred to as "lower" as well.

A driving unit 10 shown in FIG. 1 includes a driving device 20 that generates and transmits a driving force and a force detecting device 1 that detects a force. The driving device 20 and the force detecting device 1 are unitized. The driving device 20 includes a motor 30, an encoder 40 that detects a rotating state of the motor 30, a flange 50 fixed to the motor 30, and a reduction gear 60 that reduces and outputs a driving force of the motor 30. First, the configurations of the sections of the driving unit 10 are briefly explained below in order.

The motor 30 is any one of various motors such as a two-phase AC brushless motor, a three-phase AC brushless motor, and a three-phase synchronous motor. The motor 30 includes a rotating shaft 301 that is disposed along an axis line z1 parallel to the z axis and rotates around the axis line z1, a rotor 302 fixed to the rotating shaft 301, a stator 303 disposed around the rotor 302, and a cylindrical housing 304 that houses the rotating shaft 301, the rotor 302, and the stator 303 and supports the stator 303. Note that the sections of the motor 30 can be configured the same as sections of a publicly-known motor.

The encoder 40 is, for example, an optical or magnetic multi-rotation detection type encoder. The encoder 40 includes a base section 401 attached to one end portion (in FIG. 1, a lower end portion) of the housing 304 of the motor 30 and a rotating body 404 attached to one end portion (in FIG. 1, a lower end portion) of the rotating shaft 301 of the motor 30.

The base section 401 is formed in a tabular shape and includes a through-hole 402 through which the rotating shaft 301 pierces. A bearing 403 is provided in the through-hole 402. The rotating shaft 301 is supported to be capable of rotating around the axis line z1 with respect to the base section 401 via the bearing 403. The base section 401 and the bearing 403 are considered to configure a part of the housing 304 of the motor 30. A detecting section (not shown in the figure) that detects a rotating state of the rotating body 404 is attached to the base section 401. When the encoder 40 is a magnetic encoder, for example, the rotating body 404 is a structure including a plurality of magnets. On the other hand, such a detecting section includes a magnetic sensor that detects a magnetism change involved in the rotation of the rotating body 404. When the encoder 40 is an optical encoder, for example, the rotating body 404 is a slit plate, a polarizing plate, or the like. On the other hand, such a detecting section includes a light emitting element that irradiates light on the rotating body 404 and a light receiving element that receives reflected light and transmitted light from the rotating body 404.

Note that the sections of the encoder 40 can be configured the same as sections of a publicly-known encoder. The encoder 40 is not limited to the multi-rotation detection type and may be publicly-known various encoders other than the multi-rotation detection type. In the figure, the base section 401 is configured separately from the housing 304 and fixed to the housing 304 using not-shown bolts and the like. However, the base section 401 may be formed integrally with the housing 304.

The flange 50 is fixed to the base section 401 using not-shown bolts and the like. The flange 50 is formed in a tabular shape and fixed to an object using, for example, not-shown bolts. Consequently, the driving unit 10 can be attached to the object. A through-hole 501, which pieces through the flange 50 in the thickness direction thereof, is formed in the flange 50. The encoder 40 is set (housed) in the through-hole 501.

The reduction gear 60 is a wave gear device. The reduction gear 60 includes a base section 601 attached to the other end portion (in FIG. 1, an upper end portion) of the housing 304 of the motor 30, a cylindrical housing 604 capable of rotating around the axis line z1 with respect to the base section 601, a rigid gear 606 and an output section 609 fixed to the housing 604, a cup-type flexible gear 607 disposed on the inner side of the rigid gear 606, and a wave generator 608 disposed on the inner side of the flexible gear 607.

The base section 601 is formed in a tabular shape and includes a through-hole 602 through which the rotating shaft 301 pieces. A bearing 603 is provided in the through-hole 602. The rotating shaft 301 is rotatably supported around the axis line z1 with respect to the base section 601 via the bearing 603. The base section 601 and the bearing 603 are considered to configure apart of the housing 304 of the motor 30. Across roller bearing 605 is disposed between the base section 601 and the housing 604. Consequently, the housing 604 is turnably supported around the axis line z1 with respect to the base section 601. The output section 609 is a portion that reduces and outputs rotation of the rotating shaft 301 and has a function of a cover member (a member configuring a part of a casing of the reduction gear 60) that covers, from an upward direction in FIG. 1, the rigid gear 606, the flexible gear 607, the wave generator 608, and the like present in the inside of the reduction gear 60. Note that, in the figure, the base section 601 is configured separately from the housing 304. The base section 601 is fixed to the housing 304 using not-shown bolts and the like. However, the base section 601 may be formed integrally with the housing 304.

The rigid gear 606 is a ring-like internal gear configured by a rigid body that does not substantially bend in the radial direction. The flexible gear 607 is an external gear that has flexibility for enabling deflective deformation in the radial direction and meshes with the rigid gear 606. The number of teeth of the flexible gear 607 is smaller than the number of teeth of the rigid gear 606. The bottom section of the cup-like flexible gear 607 is fixed to the base section 601 using not-shown bolts and the like. The wave generator 608 is attached to the other end portion (in FIG. 1, an upper end portion) of the rotating shaft 301 of the motor 30. The wave generator 608 deforms the flexible gear 607 in one direction perpendicular to the rotating shaft 301 and partially meshes the flexible gear 607 with the rigid gear 606 and moves a position of the meshing in the circumferential direction according to the rotation of the rotating shaft 301. The rigid gear 606 rotates around the axis line z1 because of the difference in the number of teeth between the rigid gear 606 and the flexible gear 607. At this point, the housing 604 and the output section 609 rotate with respect to the flexible gear 607 together with the rigid gear 606. Consequently, it is possible to reduce a driving force from the rotating shaft 301 and output the driving force from the output section 609. When the output section 609 rotates, a first member 2 integral (shared) with the output section 609 and sensor devices 4 and a second member 3 connected to the output section 609 rotate in the same direction.

Note that, in the figure, the rigid gear 606 is configured separately from the housing 604 and the output section 609 and fixed to the housing 604 and the output section 609 using not-shown bolts and the like. However, the rigid gear 606 may be formed integrally with at least one of the housing 604 and the output section 609. The sections of the reduction gear 60 are not limited to the sections shown in the figure and can be configured the same as sections of publicly-known various reduction gears.

The force detecting device 1 has a function of detecting an external force acting on the force detecting device 1. The force detecting device 1 includes the first member 2, the second member 3, and the sensor devices 4 disposed between the first member 2 and the second member 3. As explained below, the sensor devices 4 include piezoelectric elements 5. The first member 2 also functions as the output section 609 of the reduction gear 60. That is, the first member 2 is integrated (shared) with the output section 609, which is a part of the driving device 20. Consequently, it is possible to reduce the number of components of the driving unit 10 and achieve simplification of the structure and a reduction in the size of the driving unit 10. The second member 3 can also function as at least a part of an arm of a robot 1000 explained below. Consequently, it is possible to reduce the number of components of the robot 1000 and achieve simplification of the structure and a reduction in the size of the robot 1000. The force detecting device 1 is explained in detail below.

Force Detecting Device

Figure 2:
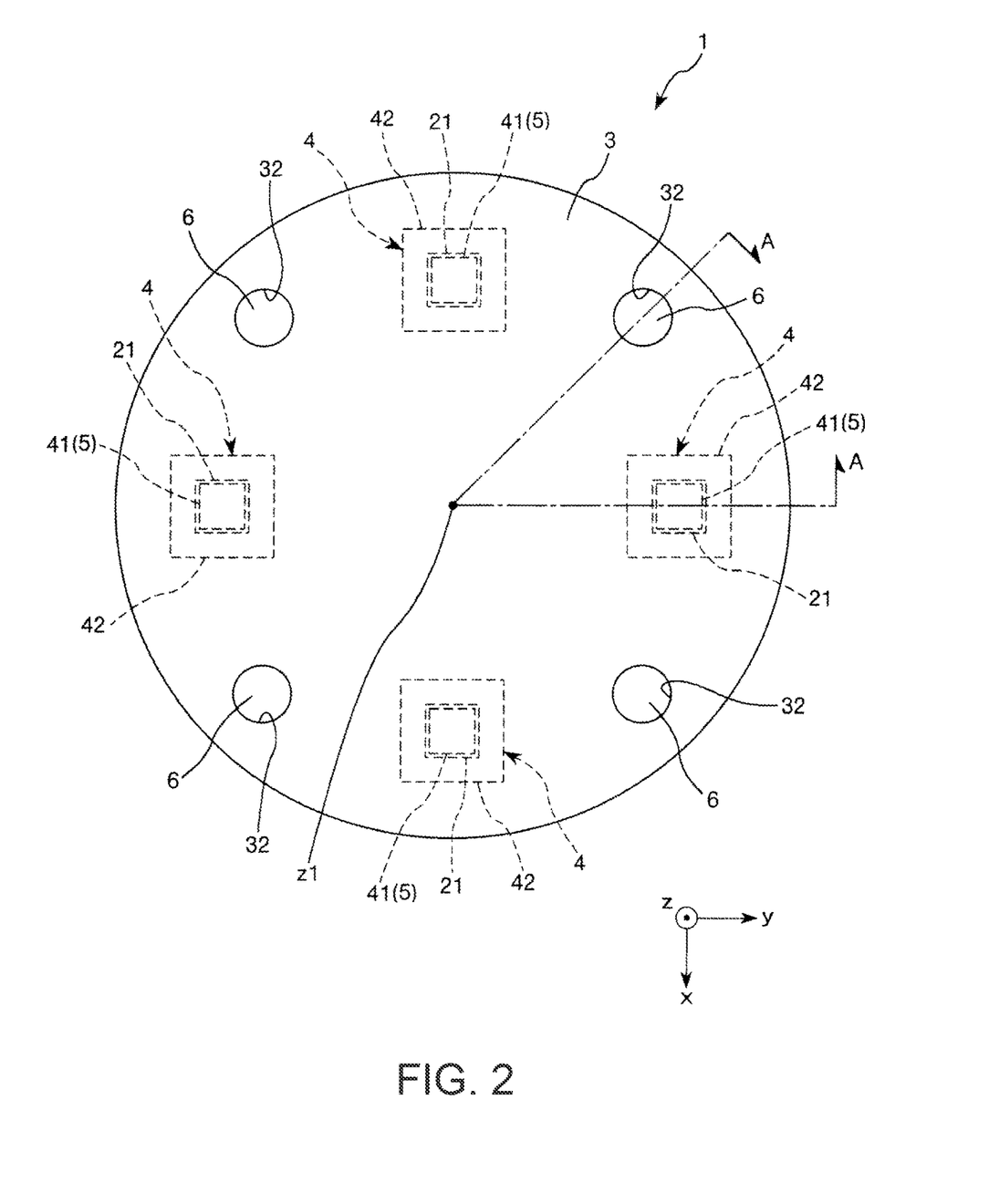
FIG. 2 is a plan view of a force detecting device included in the driving unit shown in FIG. 1.
Figure 3:
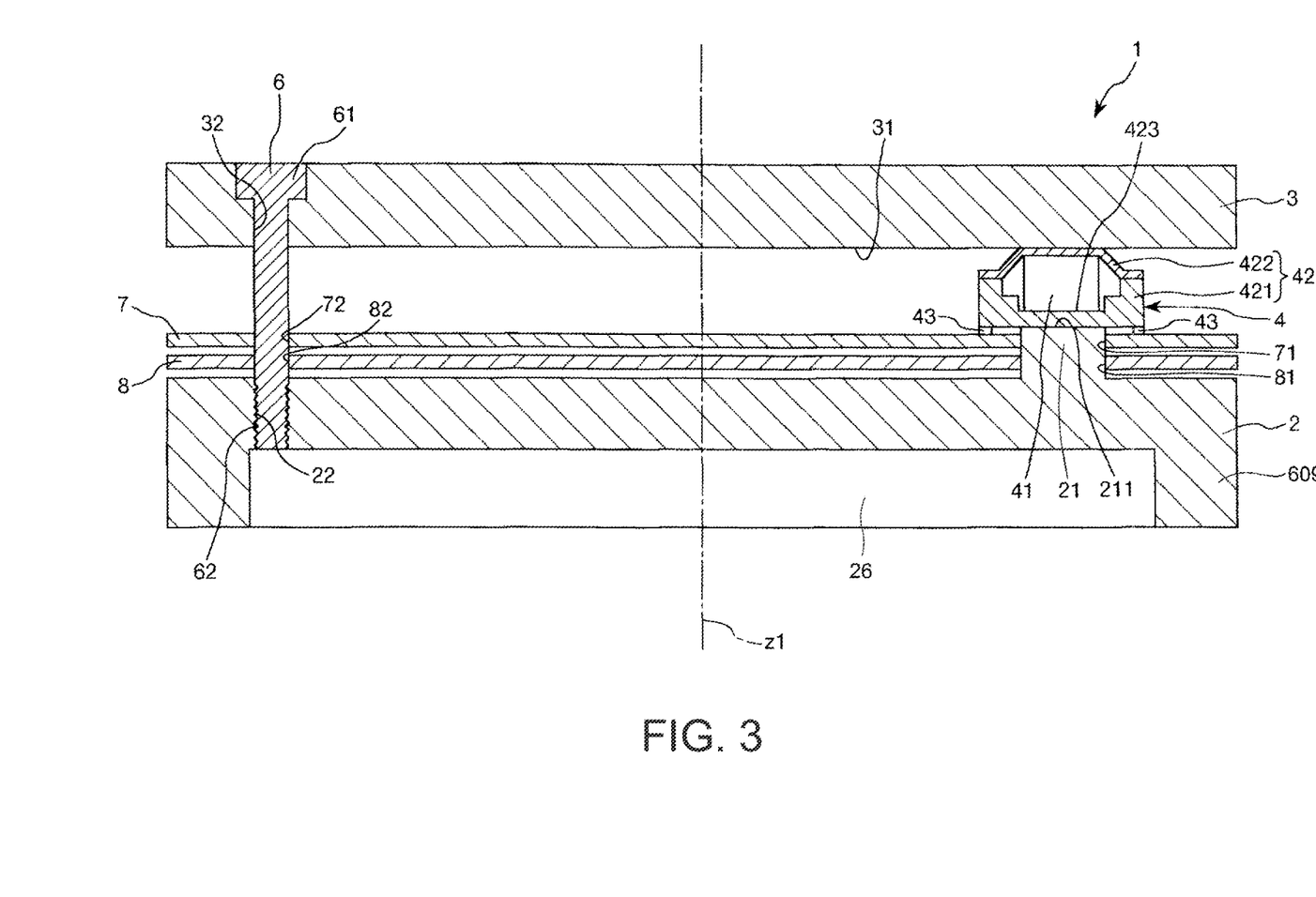
FIG. 3 is an A-A line sectional view in FIG. 2.
Figure 4:
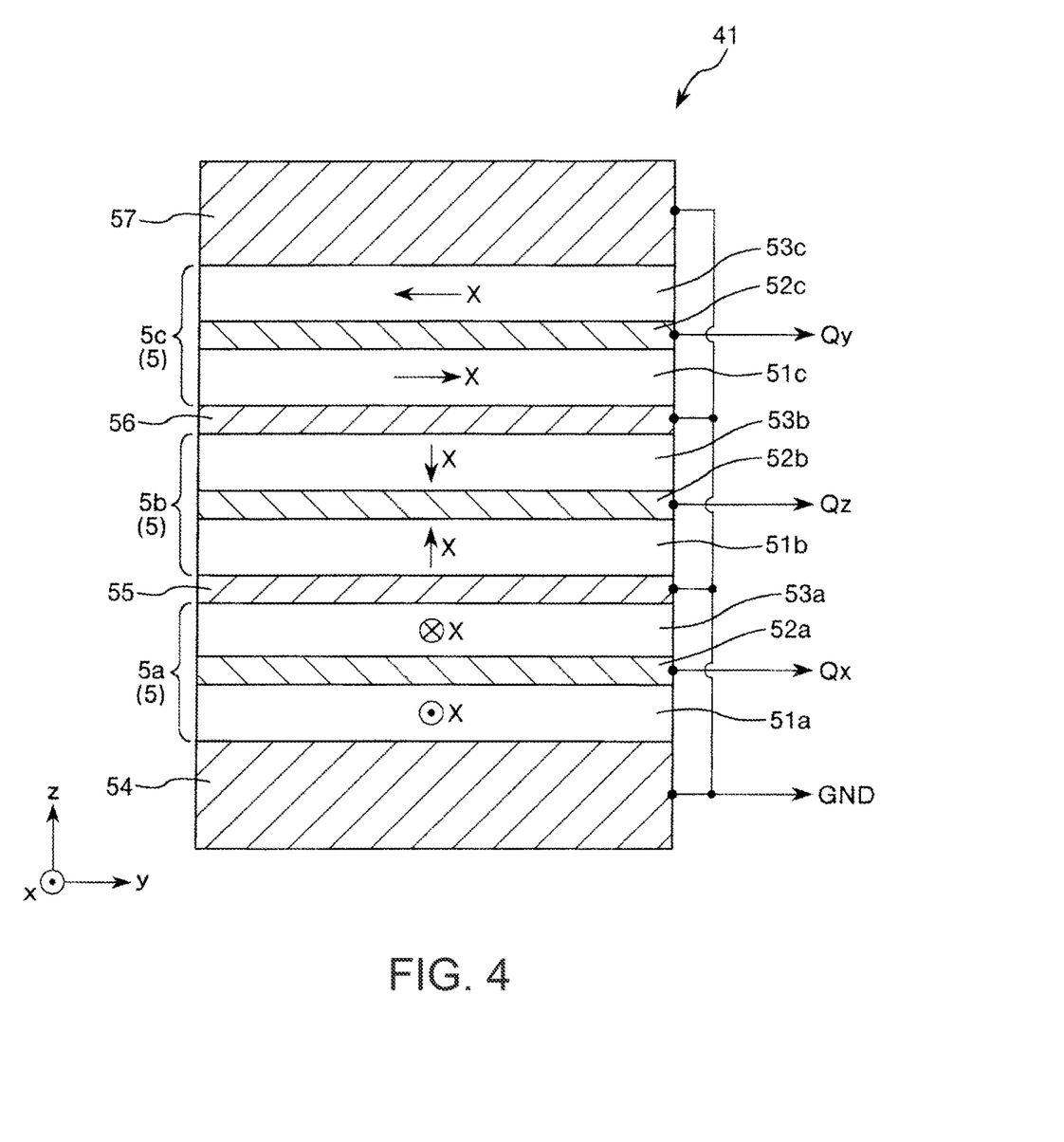
FIG. 4 is a sectional view of a charge output element included in the force detecting device shown in FIG. 3.
Figure 5:
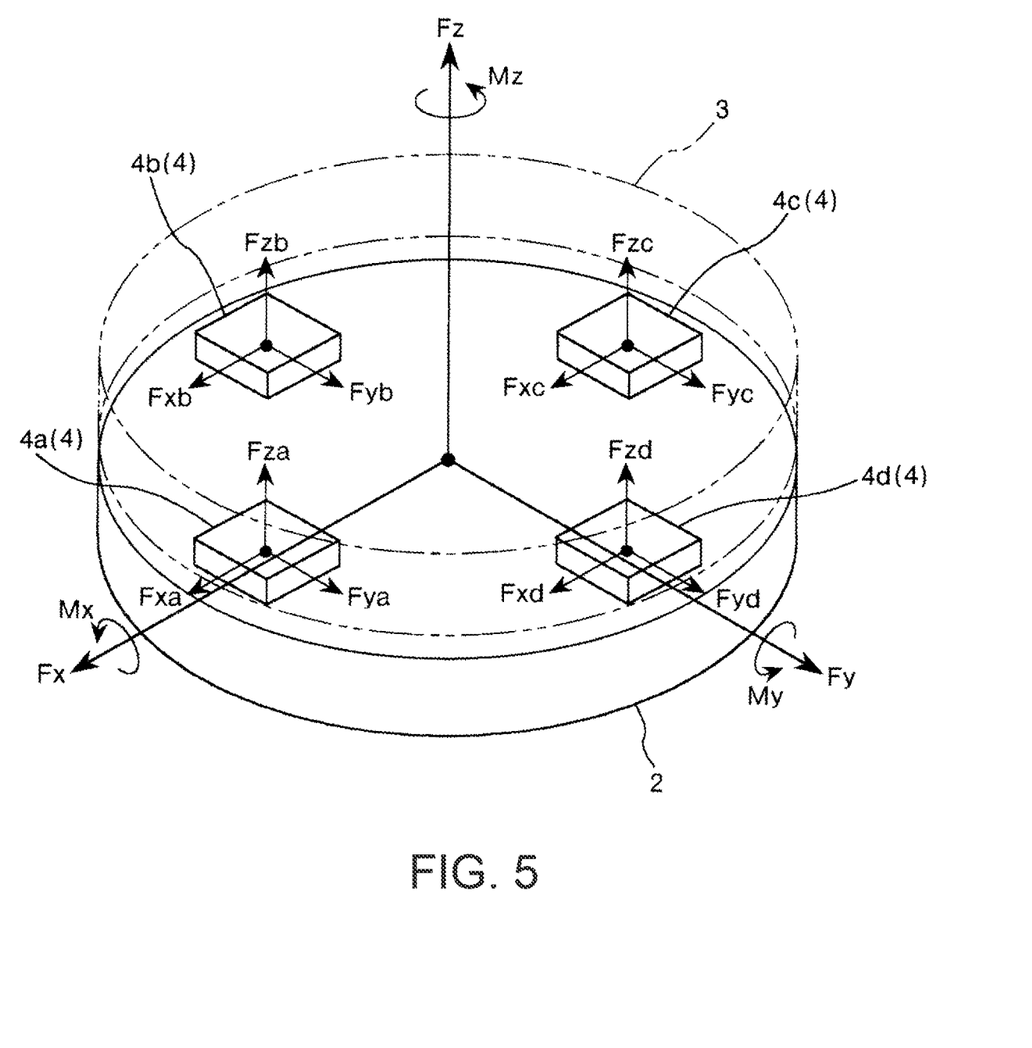
FIG. 5 is a diagram for explaining action of the force detecting device shown in FIGS. 3 and 4.

FIG. 2 is a plan view of the force detecting device included in the driving unit shown in FIG. 1. FIG. 3 is an A-A line sectional view in FIG. 2. FIG. 4 is a sectional view of a charge output element included in the force detecting device shown in FIG. 3. FIG. 5 is a diagram for explaining action of the force detecting device shown in FIGS. 3 and 4. Note that, in FIG. 2, for convenience of explanation, an x axis, a y axis, and a z axis are shown as three axes orthogonal to one another to correspond to the axes in FIG. 1. Distal end sides of arrows indicating the axes are represented as "+" and proximal end sides of the arrows are represented as "−". A direction parallel to the x axis is referred to as "x-axis direction", a direction parallel to the y axis is referred to as "y-axis direction", and a direction parallel to the z axis is referred to as "z-axis direction". A +Z-axis direction side is referred to as "upper" as well and a −z-axis direction side is referred to as "lower" as well. In FIG. 5, an analog circuit board 7 and a digital circuit board 8 are not shown.

The force detecting device 1 shown in FIG. 2 is a six-axis force sensor capable of detecting six-axis components of an external force applied to the force detecting device 1. The six-axis components include translation force (shearing force) components in the respective directions of the three axes (in the figure, the x axis, the y axis, and the z axis) orthogonal to one another and torque (moment) components around the respective three axes.

The force detecting device 1 includes, as shown in FIG. 3, the first member 2, the second member 3 disposed spaced apart from the first member 2, a plurality of (in this embodiment, four) sensor devices 4 disposed between the first member 2 and the second member 3, the analog circuit board 7 and the digital circuit board 8, and a plurality of (in this embodiment, four) pressurizing bolts 6 that fix the first member 2 and the second member 3 to each other. The plurality of sensor devices 4 are arranged at equal intervals one another along the same circumference centering on the axis line z1.

In the force detecting device 1, the sensor devices 4 output signals corresponding to a received external force and the analog circuit board 7 and the digital circuit board 8 process the signals. Consequently, the force detecting device 1 detects six-axis components of the external force applied to the force detecting device 1.

First Member

As shown in FIG. 3, the first member 2 has a substantially tabular overall shape. In the figure, an external shape in plan view of the first member 2 is a circular shape. However, the external shape is not limited to this and may be, for example, a polygonal shape such as a square shape or a pentagonal shape or an elliptical shape. A plurality of convex sections 21 are provided in positions apart from the axis line z1 on one surface (an upper side in FIG. 3) of the first member 2, more specifically, a surface on the second member 3 side of the first member 2. As shown in FIG. 2, the plurality of convex sections 21 are arranged at equal intervals one another along the same circumference centering on the axis line z1. As shown in FIG. 3, top faces 211 (end faces) of the convex sections 21 are planes. In the figure, the shape of the top surfaces 211 is a square shape. However, the shape is not limited to this and may be, for example, a polygonal shape such as a square shape or a pentagonal shape or an elliptical shape. In the first member 2, a plurality of female screws 22 screwed with the pressurizing bolts 6 are provided in positions apart from the axis line z1. The plurality of female screws 22 are arranged at equal intervals one another along the same circumference centering on the axis line z1.

In the figure, a concave section 26 is formed on the other surface (on the lower side in FIG. 3) of the first member 2. In the concave section 26, the rigid gear 606 of the reduction gear 60 is disposed (see FIG. 1). Consequently, it is possible to fix the first member 2 to the rigid gear 606 or the housing 604 while preventing the flexible gear 607 and the wave generator 608 of the reduction gear 60 from coming into contact with the first member 2.

A constituent material of the first member 2 is not particularly limited. Examples of the constituent material include metal materials such as stainless steel and ceramics. Note that, in the figure, the convex section 21 is formed integrally with a tabular portion of the first member 2. However, the convex section 21 may be formed as a member separate from the tabular portion. In this case, constituent materials of the convex section 21 and the tabular portion may be the same or may be different from each other.

Second Member

As shown in FIG. 3, the second member 3 has a substantially tabular overall shape. In the figure, an external shape in plan view of the second member 3 is a circular shape. However, the external shape is not limited to the circular shape and may be, for example, a polygonal shape such as a square shape or a pentagonal shape or an elliptical shape. In the second member 3, a plurality of through-holes 32, through which the pressurizing bolts 6 are inserted, are provided in positions apart from the axis line z1 to correspond to the plurality of female screws 22 of the first member 2. In upper parts of the through-holes 32, step sections (increased diameter sections) engaging with heads 61 of the pressurizing bolts 6 are formed.

A constituent material of the second member 3 is not particularly limited. Examples of the constituent material include metal materials such as stainless steel and ceramics. Note that the constituent material of the second member 3 may be the same as or may be different from the constituent material of the first member 2.

Sensor Device

Each of the sensor devices 4 includes, as shown in FIG. 3, a force detecting element 41 and a package 42 that houses the force detecting element 41.

The package 42 includes a base section 421 including a concave section 423 in which the force detecting element 41 is set and a lid body 422 jointed to the base section 421. The concave section 423 is sealed by the lid body 422. Consequently, it is possible to protect the force detecting element 41. The base section 421 is set on the top surface 211 of the convex section 21 of the first member 2. A plurality of terminals 43 electrically connected to the analog circuit board 7 are provided on the lower surface of the base section 421. The plurality of terminals 43 are electrically connected to the force detecting element 41 via a through electrode (not shown in the figure) that pierces through the base section 421. The lid body 422 is formed in a tabular shape. A surface on the base section 421 side of the lid body 422 is in contact with the force detecting element 41. On the other hand, a surface on the opposite side of the base section 421 is in contact with the second member 3.

A constituent material of the base section 421 of the package 42 is not particularly limited. For example, an insulative material such as ceramics can be used. A constituent material of the lid body 422 is not particularly limited. For example, various metal materials such as stainless steel can be used. Note that the constituent material of the base section 421 and the constituent material of the lid body 422 may be the same or may be different from each other. In the figure, a shape in plan view of the package 42 is a square shape. However, the shape is not limited to this and may be, for example, another polygonal shape such as a pentagonal shape, a circular shape, or an elliptical shape. Note that, in the figure, a plan view shape of the force detecting element 41 is a square shape. However, the plan view shape is not limited to the square shape and may be, for example, another polygonal shape such as a pentagonal shape, a circular shape, or an elliptical shape.

The force detecting element 41 has a function of outputting an electric charge Qx corresponding to a component in the x-axis direction of an external force applied to the force detecting element 41, an electric charge Qy corresponding to a component in the y-axis direction of the external force applied to the force detecting element 41, and an electric charge Qz corresponding to a component in the z-axis direction of the external force applied to the force detecting element 41. The force detecting element 41 includes, as shown in FIG. 4, a piezoelectric element 5a that outputs the electric charge Qx according to an external force (a shearing force) parallel to the x axis, a piezoelectric element 5b that outputs the electric charge Qz according to an external force (a compression/tensile force) parallel to the z axis, a piezoelectric element 5c that outputs the electric charge Qy according to an external force (a shearing force) parallel to the y axis, and ground electrode layers 54, 55, 56, and 57 electrically connected to a reference potential (e.g., aground potential). The ground electrode layer 54, the piezoelectric element 5a, the ground electrode layer 55, the piezoelectric element 5b, the ground electrode layer 56, the piezoelectric element 5c, and the ground electrode layer 57 are stacked in this order.

Note that, in the following explanation, the piezoelectric elements 5a, 5b, and 5c are collectively referred to as "piezoelectric element 5" as well. At least a part of the ground electrode layer 54 is considered to configure a part of the piezoelectric element 5a. Similarly, at least a part of the ground electrode layer 55 is considered to configure a part of the piezoelectric element 5a and is considered to configure a part of the piezoelectric element 5b. At least a part of the ground electrode layer 56 is considered to configure a part of the piezoelectric element 5b and is considered to configure a part of the piezoelectric element 5c. The ground electrode layer 57 is considered to configure a part of the piezoelectric element 5c.

The piezoelectric element 5a is configured by stacking a piezoelectric layer 51a, an output electrode layer 52a, and a piezoelectric layer 53a in this order. That is, the piezoelectric element 5a includes the piezoelectric layers 51a and 53a and the output electrode layer 52a disposed between the piezoelectric layers 51a and 53a. Similarly, the piezoelectric element 5b includes piezoelectric layers 51b and 53b and an output electrode layer 52b disposed between the piezoelectric layers 51b and 53b. The piezoelectric element 5c includes piezoelectric layers 51c and 53c and an output electrode layer 52c disposed between the piezoelectric layers 51c and 53c.

The piezoelectric layers 51a, 53a, 51b, 53b, 51c, and 53c are respectively configured by quartz. However, as shown in FIG. 4, directions of X axes, which are crystal axes of the quartz configuring the piezoelectric layers 51a, 53a, 51b, 53b, 51c, and 53c are different. That is, the X axis of the quartz configuring the piezoelectric layer 51a faces the front side on the paper surface in FIG. 4. The X axis of the quartz configuring the piezoelectric layer 53a faces the inner side on the paper surface in FIG. 4. The X axis of the quartz configuring the piezoelectric layer 51b faces the upper side in FIG. 4. The X axis of the quartz configuring the piezoelectric layer 53b faces the lower side in FIG. 4. The X axis of the quartz configuring the piezoelectric layer 51c faces the right side in FIG. 4. The X axis of the quartz configuring the piezoelectric layer 53c faces the left side in FIG. 4. The piezoelectric layers 51a, 53a, 51c, and 53c are respectively configured by Y-cut quartz plates. The directions of the X axes of the piezoelectric layers 51a, 53a, 51c, and 53c are different from one another by 90°. The piezoelectric layers 51b and 53b are respectively configured by X-cut quartz plates. The directions of the X axes of the piezoelectric layers 51b and 53b are different from each other by 180°.

Materials forming the output electrode layers 52a, 52b, and 52c and the ground electrode layers 54, 55, 56, and 57 are respectively not particularly limited as long as the materials can function as electrodes. Examples of the materials include nickel, gold, titanium, aluminum, copper, iron, chrome, or an alloy including these kinds of metal. One or two or more kinds of these materials can be combined (e.g., stacked) and used.

The force detecting element 41 is explained above. However, the numbers of piezoelectric elements and piezoelectric layers configuring the force detecting element 41 are not limited to the numbers described above. For example, the number of piezoelectric layers included in the piezoelectric elements 5 may be one or three or more. The number of piezoelectric elements 5 included in the force detecting element 41 may be two or four or more.

Pressurizing Bolts (Fixing Members)

As shown in FIG. 3, the plurality of pressurizing bolts 6 fix the first member 2 and the second member 3 to each other in a state in which the sensor device 4 (more specifically, the piezoelectric element 5) is sandwiched and pressurized by the first member 2 and the second member 3. Since the pressurization is applied, it is possible to accurately detect an external force applied to the force detecting device 1. Further, not only when an external force in a direction in which the first member 2 and the second member 3 approach each other is applied to the force detecting element 41 but also when an external force in a direction in which the first member 2 and the second member 3 separate from each other are applied to the force detecting element, it is possible to detect the external force.

The heads 61 are provided at one end portions of the pressurizing bolts 6, male screws 62 are provided at the other end portions, and the pressurizing bolts 6 are inserted through the through holes 32 of the second member 3 from the opposite side of the first member 2. The heads 61 are engaged in the step sections of the through holes 32. The male screws 62 are screwed in the female screws 22 of the first member 2. With the plurality of pressurizing bolts 6, it is possible to sandwich and pressurize the force detecting element 41 via the package 42 of the sensor device 4 with the top surfaces 211 of the convex sections 21 of the first member 2 and a lower surface 31 of the second member 3. By adjusting a fastening force of the pressurizing bolts 6 as appropriate, it is possible to apply a pressure in the z-axis direction having predetermined magnitude to the force detecting element 41. When there are a plurality of sensor device 4, by adjusting fastening forces of the pressurizing bolts 6 as appropriate, it is possible to collectively apply pressure in the z-axis direction having predetermined magnitude to all the sensor devices 4 (the plurality of piezoelectric element 5) as pressurization. A constituent material of the pressurizing bolts 6 is not particularly limited. Examples of the constituent material include various metal materials.

Note that the positions and the number of the pressurizing bolts 6 are respectively not limited to the positions and the number shown in the figure. For example, distances between at least two of the plurality of pressurizing bolts 6 and the axis line z1 may be different from each other. The number of the pressurizing bolts 6 may be, for example, three or less or five or more.

Analog Circuit Board

The analog circuit board 7 is disposed between the first member 2 and the second member 3. Consequently, it is possible to reduce a wiring length from the sensor device 4. There is an advantage that this contributes to simplification of structure. In the analog circuit board 7, through-holes 71, through which the convex sections 21 of the first member 2 are inserted, and through-holes 72, through which the pressurizing bolts 6 are inserted, are formed. The analog circuit board 7 are fit with the convex sections 21 or fixed to the convex sections 21 by an adhesive or the like and supported.

The analog circuit board 7 is electrically connected to the plurality of terminals 43 included in the sensor device 4. Although not shown in the figure, the analog circuit board 7 includes a conversion output circuit that converts the electric charges Qx, Qy, and Qz output from the force detecting element 41 of the sensor device 4 respectively into voltages Vx, Vy, and Vz. The conversion output circuit can be configured to include, for example, an operational amplifier, a capacitor, and a switching element.

Digital Circuit Board

The digital circuit board 8 is disposed between the first member 2 and the second member 3 (more specifically, between the first member 2 and the analog circuit board 7). Consequently, it is possible to reduce a wiring length from the sensor device 4. There is an advantage that this contributes to simplification of structure. As in the analog circuit board 7, in the digital circuit board 8, through-holes 81, through which the convex sections 21 of the first member 2 are inserted, and through-holes 82, through which the pressurizing bolts 6 are inserted, are formed. The digital circuit board 8 is fit with the convex sections 21 or fixed to the convex sections 21 by an adhesive or the like and supported.

The digital circuit board 8 is electrically connected to the analog circuit board 7. Although not shown in the figure, the digital circuit board 8 includes an external force detection circuit that detects (calculates) an external force on the basis of the voltages Vx, Vy, and Vz output from the analog circuit board 7. The external force detection circuit can be configured to include, for example, an AD converter and an arithmetic circuit such as a CPU connected to the AD converter.

The digital circuit board 8 calculates, on the basis of voltages Vxa, Vya, Vza, Vxb, Vyb, Vzb, Vxc, Vyc, Vzc, Vxd, Vyd, and Vzd output from the analog circuit board 7, a translation force component Fx in the x-axis direction, a translation force component Fy in the y-axis direction, a translation force component Fz in the z-axis direction, a torque component Mx around the x axis, a torque component My around the y axis, and a torque component Mz around the z axis shown in FIG. 5. The force components can be calculated by the following expressions.

$$Fx = Vxa + Vxb + Vxc + Vxd$$

$$Fy = Vya + Vyb + Vyc + Vyd$$

$$Fz = Vza + Vzb + Vzc + Vzd$$

$$Mx = R1 \times (Vzd - Vzb)$$

$$My = R2 \times (Vzc - Vza)$$

$$Mz = R1 \times (Vxb - Vxd) + R2 \times (Vya - Vyc)$$

In the expressions, R1 and R2 are respectively constants. The "voltages Vxa, Vya, and Vza", the "voltages Vxb, Vyb, and Vzb", the "voltages Vxc, Vyc, and Vzc", and the "voltages Vxd, Vyd, and Vzd" are respectively voltages Vx, Vy, and Vz concerning sensor devices 4a, 4b, 4c, and 4d (four sensor devices 4) shown in FIG. 5. Note that, in FIG. 5, translation force components Fxa, Fxb, Fxc, and Fxd in the x-axis direction, translation force components Fya, Fyb, Fyc, and Fyd in the y-axis direction, and Fza, Fzb, Fzc, and Fzd in the Z-axis direction applied to the sensor devices 4a, 4b, 4c, and 4d are shown.

In this way, the force detecting device 1 can detect the translation force components Fx, Fy, and Fz and the torque components Mx, My, and Mz. Note that the digital circuit board 8 may perform, for example, correction for eliminating a difference in sensitivity among conversion output circuits in addition to the calculation explained above.

As explained above, the force detecting device 1 includes the first member 2 configuring a part of the driving device 20 that performs at least one of generation and transmission of a driving force, the second member 3, and the piezoelectric element 5 that is disposed between the first member 2 and the second member 3 and outputs a signal according to an external force. With the force detecting device 1, since the first member 2 configures a part of the driving device 20, compared with when the first member 2 is configured separately from a driving device, it is possible to achieve a reduction in the size of the driving unit 10 including the force detecting device 1 and the driving device 20. More specifically, it is possible to reduce the number of components and achieve simplification of structure.

The piezoelectric element 5 includes the quartz. Consequently, it is possible to realize the force detecting device 1 having excellent characteristics such as high sensitivity, a wide dynamic range, and high rigidity.

In this embodiment, the force detecting device 1 includes the plurality of piezoelectric elements 5 stacked in the direction in which the first member 2 and the second member 3 are arranged. Consequently, by stacking the plurality of piezoelectric elements 5, it is possible to achieve an increase in the sensitivity of the force detecting device 1 and an increase of detection axes. Since the sensor device 4 is formed in the flat shape in the stacking direction of the plurality of piezoelectric elements 5 as explained above, compared with when the plurality of piezoelectric elements 5 in a direction perpendicular to the direction in which the first member 2 and the second member 3 are arranged, it is possible to achieve a further reduction in the size of the force detecting device 1. Since a direction of a load applied to the piezoelectric elements 5 is mainly the stacking direction of the piezoelectric elements 5, it is possible to increase the rigidity of the entire force detecting device 1.

As explained above, the driving device 20 includes the motor 30, the reduction gear 60, and the encoder 40. The first member 2 configures a part of the reduction gear 60. Consequently, it is possible to integrate (unitize) the force detecting device 1 with the reduction gear 60. Note that, if the driving device 20 includes at least one of the motor 30, the reduction gear 60, and the encoder 40, it is possible to integrate (unitize) the force detecting device 1 with any one of the motor 30, the reduction gear 60, and the encoder 40.

Further, the force detecting device 1 includes the pressurizing bolts 6, which are "fixing members" that fix the first member 2 and the second member 3 to each other in a state in which the piezoelectric elements 5 are sandwiched and pressurized by the first member 2 and the second member 3. Consequently, it is possible to reduce fluctuation in an output of the piezoelectric element 5 in a state in which an external force is not applied (a natural state). It is possible to detect, with the piezoelectric elements 5, external forces in both directions along a pressurizing direction.

As explained above, the driving unit 10 includes the force detecting device 1 and the driving device 20 that performs at least one of generation and transmission of a driving force. The first member 2 of the force detecting device 1 configures a part of the driving device 20. With the driving unit 10, since the first member 2 configures a part of the driving device 20, it is possible to achieve a reduction in size compared with when the first member 2 is configured separately from a driving device. More specifically, it is possible to reduce the number of components and achieve simplification of structure.

Second Embodiment

Figure 6:
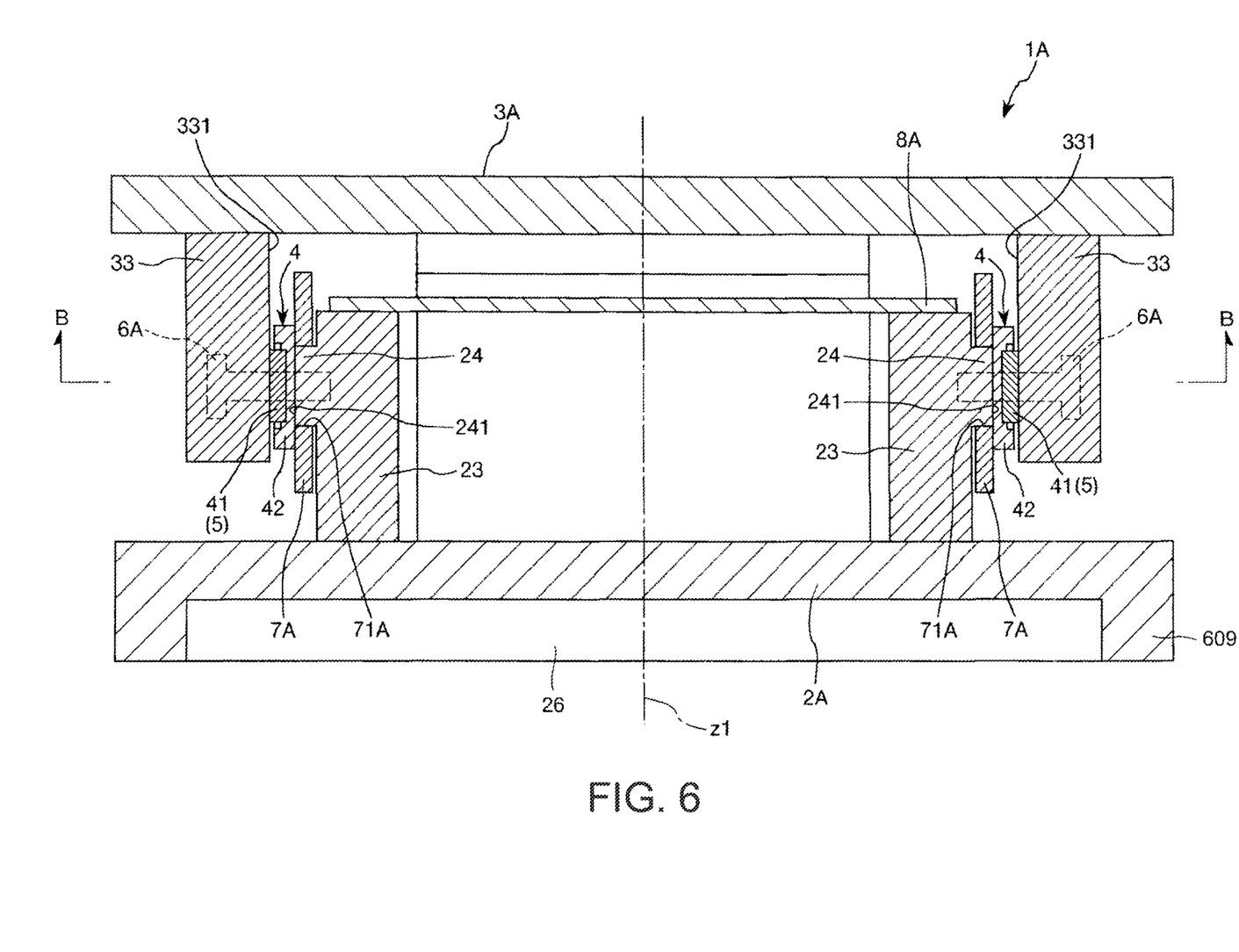
FIG. 6 is a sectional view showing a force detecting device according to a second embodiment of the invention.
Figure 7:
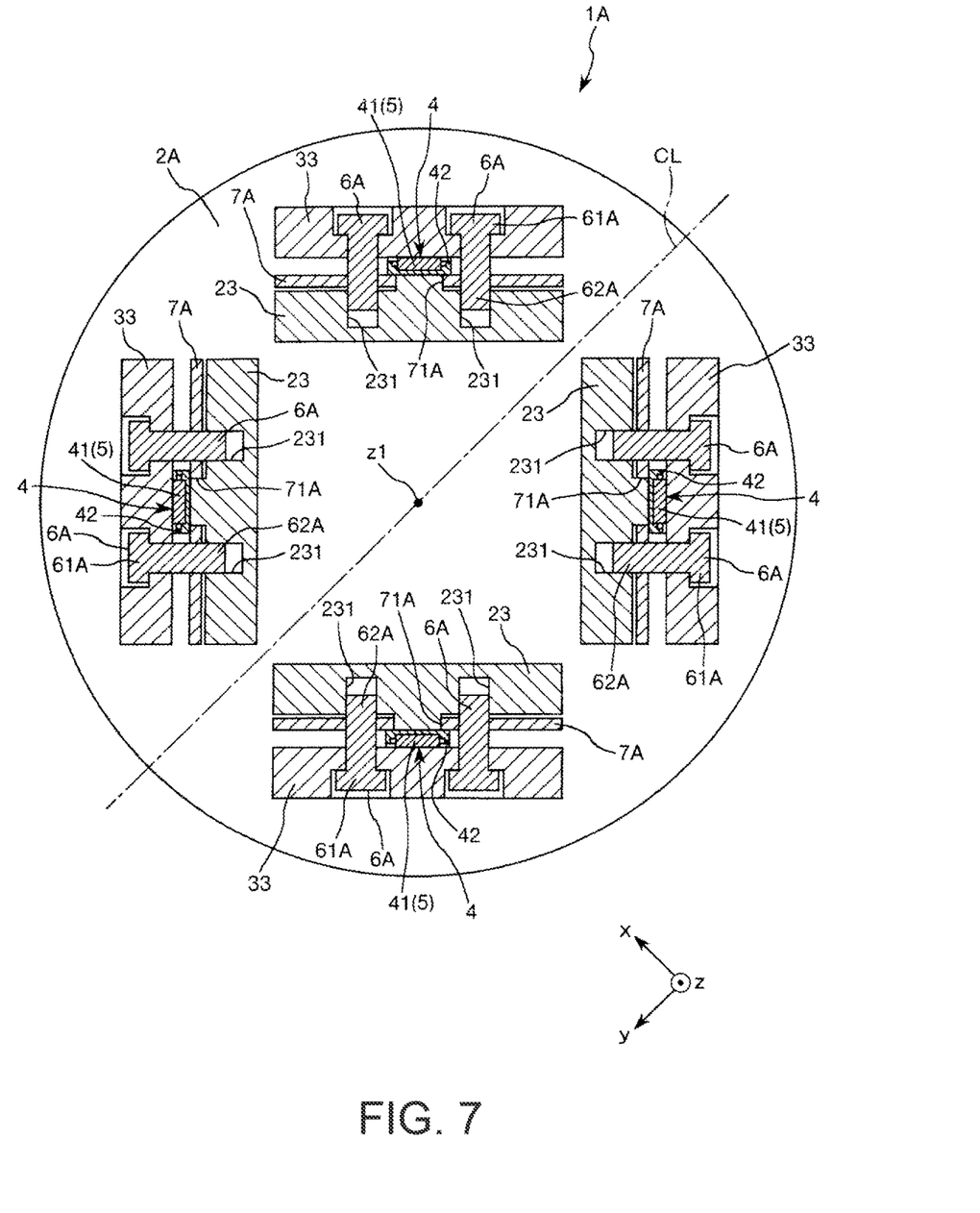
FIG. 7 is a B-B sectional view in FIG. 6.

FIG. 6 is a sectional view showing a force detecting device according to a second embodiment of the invention. FIG. 7 is a B-B line sectional view in FIG. 6.

In the following explanation, concerning the second embodiment, differences from the first embodiment are mainly explained. Explanation of similarities is omitted. Note that, in FIGS. 6 and 7, the same components as the components in the first embodiment are denoted by the same reference numerals and signs.

A force detecting device 1A shown in FIGS. 6 and 7 includes a first member 2A, a second member 3A disposed spaced apart from the first member 2A, a plurality of (in this embodiment, four) sensor devices 4 disposed between the first member 2A and the second member 3A, analog circuit boards 7A and a digital circuit board 8A, and a plurality of (in this embodiment, four) pressurizing bolts 6A that fix the first member 2A and the second member 3A to each other.

The first member 2A is the same as the first member 2 in the first embodiment except that the female screws 22 in the first embodiment are omitted and the first member 2A includes a plurality of wall sections 23 instead of the plurality of convex sections 21. The wall sections 23 are erected toward the second member 3A side. Convex sections 24 projecting to the opposite side of the axis line z1 are formed in the wall sections 23. Top surfaces 241 of the convex sections 24 are planes having normals orthogonal to the axis line z1. In the wall sections 23, female screws 231 in which male screws 62A of the pressurizing bolts 6A are screwed are formed.

The second member 3A is the same as the second member 3 in the first embodiment except that the through-holes 32 in the first embodiment are omitted and a plurality of wall sections 33 are added. The wall sections 33 are erected toward the first member 2A side. The wall sections 33 are disposed on the opposite side of the axis line z1 with respect to the wall sections 23 of the first member 2A. Surfaces 331 on the wall section 23 side of the wall section 33 are parallel to the top surfaces 241 of the convex sections 24. The pressurizing bolts 6A are inserted through and heads 61A of the pressurizing bolts 6A are engaged in the wall sections 33.

The sensor devices 4 are disposed between the top surfaces 241 of the first member 2A and the surfaces 331 of the second member 3A. The sensor devices 4 are sandwiches and pressurized between the top surfaces 241 and the surfaces 331 by the plurality of pressurizing bolts 6A. The sensor devices 4 are disposed such that a stacking direction of the force detecting elements 41 is orthogonal to the axis line z1. Consequently, the force detecting elements 41 receive pressurization in the stacking direction. The four sensor devices 4 are disposed to be symmetrical with respect to a line segment CL passing the axis line z1 and parallel to the y axis when viewed from a direction along the z1 axis. The four sensor devices 4 are disposed at equal angle intervals around the axis line z1.

The analog circuit boards 7A are disposed between the wall sections 23 and the wall sections 33. Through-holes 71A, through which the convex sections 24 of the first member 2A are inserted, are formed in the analog circuit boards 7A. The analog circuit boards 7A are electrically connected to the sensor devices 4. The analog circuit boards 7A have the same function as the function of the analog circuit board 7 in the first embodiment.

The digital circuit board 8A is disposed across the top surfaces of the plurality of wall sections 23. The digital circuit board 8A calculates the translation force components Fx, Fy, and Fz and the torque components Mx, My, and Mz on the basis of voltages output from the analog circuit boards 7A. In this embodiment, since a posture of the sensor devices 4 is different from the posture in the first embodiment, the digital circuit board 8A performs calculation taking into account the difference in the posture. In that case, it is possible to calculate the translation force components Fx, Fy, and Fz and the torque components Mx, My, and Mz without using the electric charge Qz that is easily affected by temperature fluctuation. Therefore, the force detecting device 1A is less easily affected by fluctuation in temperature. There is an advantage that highly accurate detection is possible.

According to the second embodiment explained above, as in the first embodiment, it is possible achieve a reduction in the size of a unit including the force detecting device 1A and a driving device.

Third Embodiment

Figure 8:
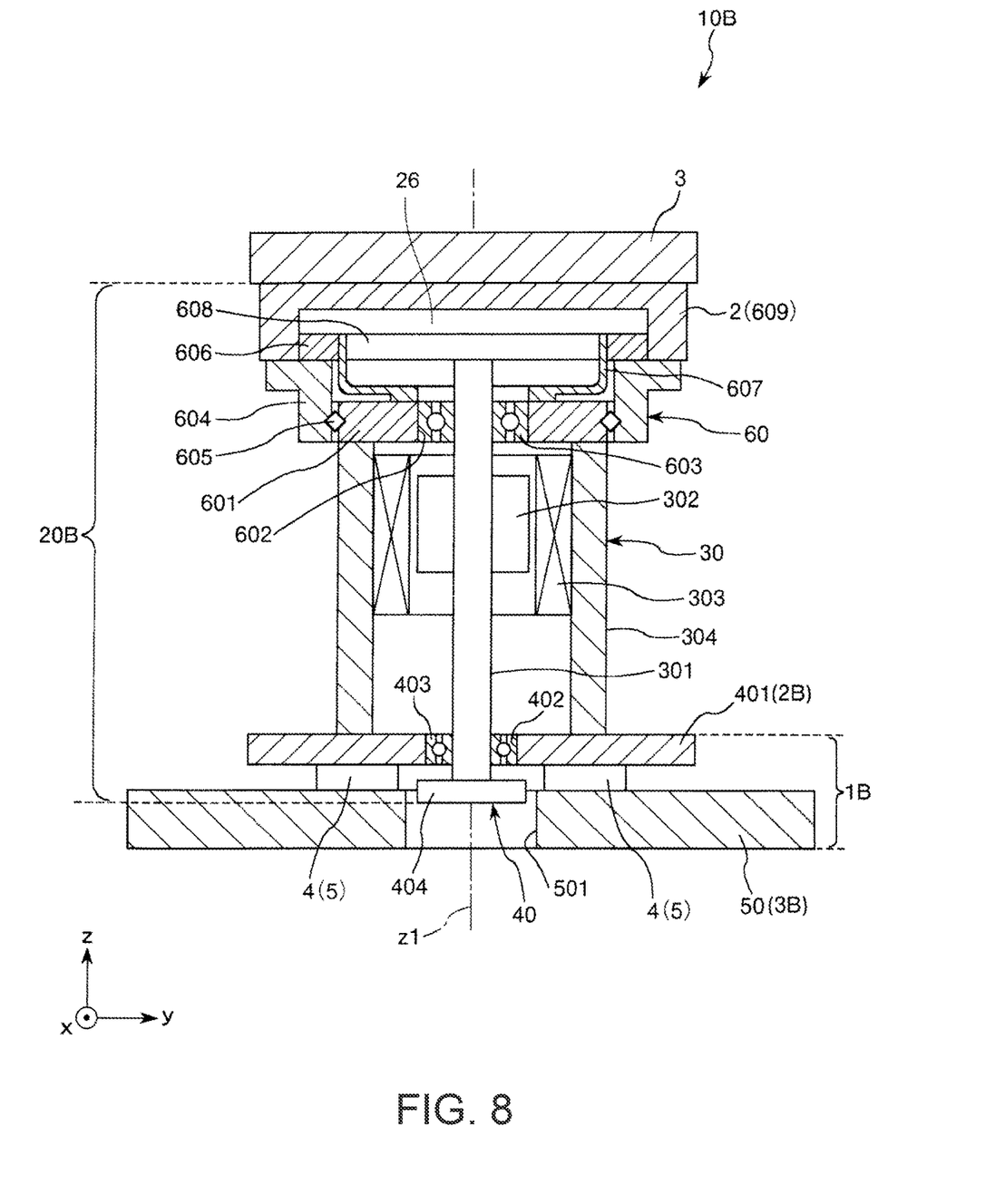
FIG. 8 is a sectional view showing a driving unit according to a third embodiment of the invention.

FIG. 8 is a sectional view showing a driving unit according to a third embodiment of the invention.

In the following explanation, concerning the third embodiment, differences from the embodiments explained above are mainly explained. Explanation of similarities is omitted. Note that, in FIG. 8, the same components as the components in the embodiments explained above are denoted by the same reference numerals and signs.

A driving unit 10B shown in FIG. 8 is the same as the driving unit 10 in the first embodiment except that the plurality of sensor devices 4 are provided between the base section 401 of the encoder 40 and the flange 50 rather than between the first member 2 and the second member 3 in the first embodiment.

The driving unit 10B includes a driving device 20B that generates and transmits a driving force and a force detecting device 1B that detects a force. The driving device 20B and the detecting device 1B are unitized. The driving device 20B includes the motor 30, the encoder 40 that detects a rotating state of the motor 30, and the reduction gear 60 that reduces and outputs a driving force of the motor 30.

The force detecting device 1B includes a first member 2B, a second member 3B, and the sensor devices 4 disposed between the first member 2B and the second member 3B. The sensor devices 4 include the piezoelectric elements 5. The first member 2B also functions (is shared) as the base section 401 of the encoder 40. That is, the first member 2B is integrated with the base section 401. Consequently, it is possible to achieve simplification of the structure and a reduction in the size of the driving unit 10B. The second member 3B also functions as the flange 50. Consequently, it is also possible to achieve simplification of the structure and a reduction in the size of the driving unit 10B. Note that, in this embodiment, the reduction gear 60 and the second member 3 are directly fixed by not-shown bolts and the like. However, the reduction gear 60 and the second member 3 may be integrated. An analog circuit board and a digital circuit board are not shown in FIG. 8. However, the analog circuit board and the digital circuit board are desirably provided near the first member 2B or the second member 3B. Consequently, there is an advantage that it is possible to reduce a wiring length from the sensor devices 4.

In this way, in the force detecting device 1B, the first member 2B configures a part (the base section 401) of the encoder 40. Consequently, it is possible to integrate (unitize) the force detecting device 1B with the encoder 40.

According to the third embodiment explained above, as in the embodiments explained above, it is possible to achieve simplification of the structure and a reduction in the size of the driving unit 10B including the force detecting device 1B and the driving device 20B.

Robot

A robot according to an embodiment of the invention is explained with reference to a single-arm robot as an example.

Figure 9:
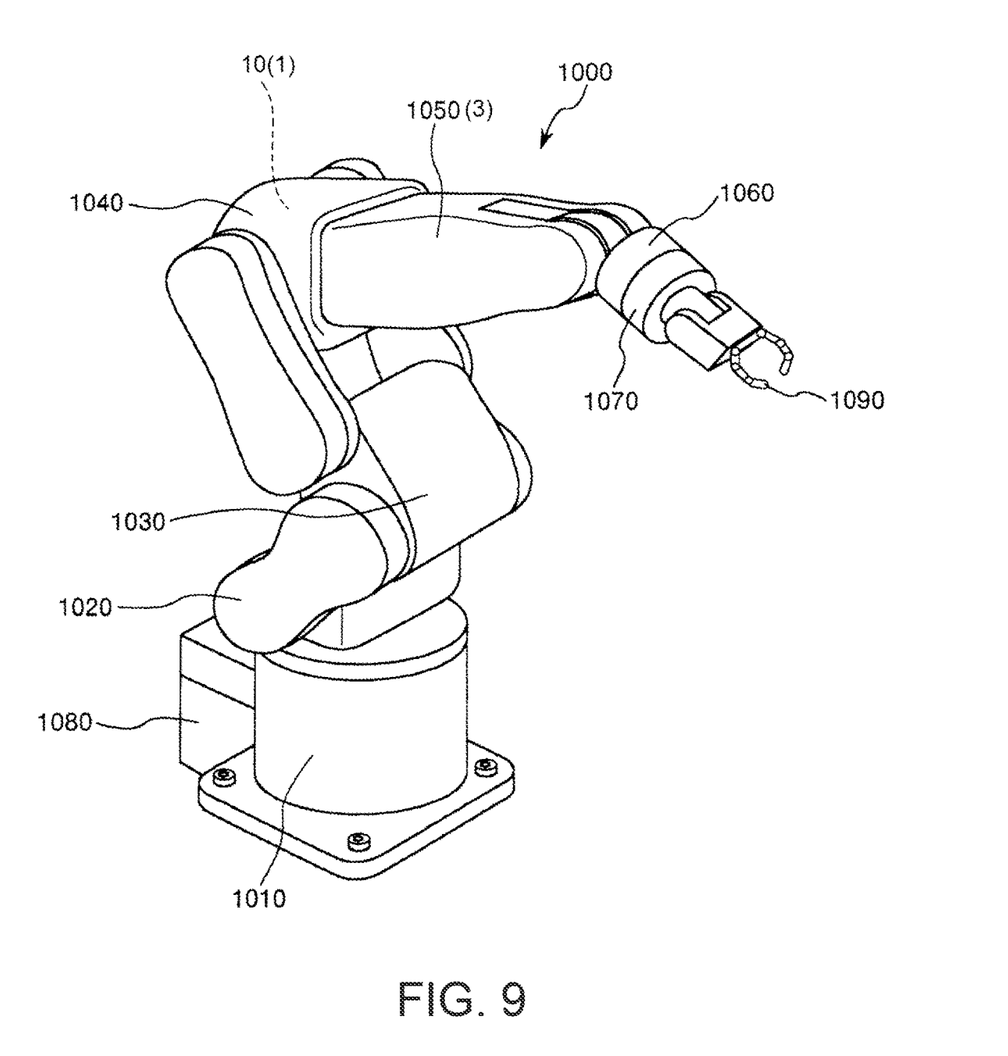
FIG. 9 is a perspective view showing an example of a robot according to an embodiment of the invention.

FIG. 9 is a perspective view showing an example of the robot according to this embodiment.

A robot 1000 shown in FIG. 9 can perform work such as supply, removal, conveyance, and assembly of a precision instrument and components (objects) configuring the precision instrument. The robot 1000 is a six-axis robot and includes a base 1010 fixed to a floor or a ceiling, an arm 1020 turnably coupled to the base 1010, an arm 1030 turnably coupled to the arm 1020, an arm 1040 turnably coupled to the arm 1030, an arm 1050 turnably coupled to the arm 1040, an arm 1060 turnably coupled to the arm 1050, an arm 1070 turnably coupled to the arm 1060, and a control section 1080 that controls driving of the arms 1020, 1030, 1040, 1050, 1060, and 1070. A hand connecting section is provided in the arm 1070. An end effector 1090 corresponding to work executed by the robot 1000 is attached to the hand connecting section.

The driving units 10 (the force detecting devices 1) are mounted on all or apart of a plurality of joint sections of the robot 1000. The arms 1020, 1030, 1040, 1050, 1060, and 1070 turn according to driving of the driving units 10. The driving of the driving units 10 is controlled by the control section 1080. Note that, in the figure, the driving unit 10 is provided in the joint section between the arm 1040 and the arm 1050. The second member 3 configures a part of the arm 1050.

The second member 3 of the force detecting device 1 configures apart of any one arm of the arms 1020, 1030, 1040, 1050, 1060, and 1070. Consequently, it is possible to reduce the length of the arm. A detection result of the force detecting device 1 is input to the control section 1080. The control section 1080 controls the driving of the driving unit 10 (more specifically, the motor 30) on the basis of the detection result of the force detecting device 1. Consequently, it is possible to easily perform an obstacle avoiding operation, an object damage avoiding operation, and the like, which are difficult by position control. It is possible to improve safety of the robot 1000.

The robot 1000 explained above includes the force detecting device 1 and the driving device 20 that performs at least one of generation and transmission of a driving force. The first member 2 of the force detecting device 1 configures a part of the driving device 20. With the robot 1000, as explained above, since the first member 2 configures a part of the driving device 20, compared with when the first member 2 is configured separately from a driving device, it is possible to achieve simplification and a reduction in the size of a unit including the force detecting device 1 and the driving device 20. Therefore, it is possible to achieve simplification and a reduction in the size of the robot 1000.

The robot 1000 includes the arm 1040, which is a "third member" that supports the driving device 20, and the arm 1050, which is a "fourth member" capable of turning with respect to the arm 1040. As explained above, the driving device 20 includes the reduction gear 60. The first member 2 configures a part of the reduction gear 60. The second member 3 configures a part of the arm 1050. Consequently, it is possible to integrate (unitize) the force detecting device 1 with the reduction gear 60 and the arm 1050. Therefore, it is possible to achieve simplification and a reduction in the size of the robot 1000.

Note that the number of arms included in the robot 1000 is five in the figure. However, the number of arms is not limited to this and may be one to four or may be six or more.

The embodiments of the invention are explained above with reference to the drawings. However, the invention is not limited to the embodiments. The components of the sections can be replaced with any components having the same functions. Any other components may be added to the invention.

The invention may be a combination of any two or more components (features) in the embodiments.

In the examples explained in the embodiments, the driving device includes the motor, the encoder, and the reduction gear. However, the driving device is not limited to this as long as the driving device is a device that performs at least one of generation and transmission of a driving force. The driving device may be, for example, a device including at least one of the motor, the encoder, and the reduction gear. In the first embodiment, only the reduction gear 60 can be considered the driving device or a unit including the motor 30 and the reduction gear 60 can be considered the driving device. In the third embodiment, only the encoder 40 can be considered the driving device. A unit including the motor 30 and the encoder 40 can be considered the driving device.

The package included in the sensor device may be omitted.

The fixing members that give pressurization to the piezoelectric elements is not limited to a form such as the pressurizing bolts as long as the fixing members can fix the first member and the second member to each other in a state in which the piezoelectric elements are sandwiched and pressurized by the first member and the second member. The pressurizing bolts only have to be provided according to necessity and may be omitted. The pressurizing bolts may fix the first member and the second member to each other without pressurizing the piezoelectric elements.

The robot according to the embodiment is not limited to the single-arm robot as long as the robot includes the arm. The robot may be another robot such as a double-arm robot or a SCARA robot.

The force detecting device and the driving unit according to the embodiments may be incorporated in an apparatus other than the robot and, for example, may be mounted on a mobile body such as an automobile.

In the example explained in the embodiments, the quartz is used as the piezoelectric body included in the piezoelectric element. However, the piezoelectric body is not limited to the quartz as long as the piezoelectric body is a material having a piezoelectric property. The piezoelectric body may be, for example, lead titanate ($PbTiO_3$), lead zirconate titanate ($Pb(Zr,Ti)O_3$), lead zirconate ($PbZrO_3$), lead lanthanum titanate ($(Pb,La)TiO_3$), lead lanthanum zirconate titanate ($(Pb,La)(Zr,Ti)O_3$), lead zirconate titanate niobate ($Pb(Zr,Ti,Nb)O_3$), or lead zirconate titanate magnesium niobate ($Pb(Zr,Ti)(Mg,Nb)O_3$).

The entire disclosure of Japanese Patent Application No. 2016-194054, filed Sep. 30, 2016 is expressly incorporated by reference herein.

What is claimed is:

1. A force detecting device comprising:
   a first member configuring a part of a reduction gear that performs transmission of a driving force, the reduction gear including housing and an output member that defines the first member, the reduction gear further including a rigid gear fixed to the housing, a flexible gear configured to mesh with the rigid gear, and a wave generator that drives the flexible gear to mesh with the rigid gear during rotation of the wave generator;
   a second member; and
   a piezoelectric element disposed between the first member and the second member and configured to output a signal according to an external force that includes translation force components exerted along three axes that are each orthogonal to one another and torque components that are exerted around each of the three axes.

2. The force detecting device according to claim 1, wherein the piezoelectric element includes quartz.

3. A robot comprising:
   the force detecting device according to claim 2; and
   a driving device configured to generate a driving force.

4. The force detecting device according to claim 1, wherein the force detecting device includes a plurality of the piezoelectric elements stacked in a direction in which the first member and the second member are arranged.

5. A robot comprising:
   the force detecting device according to claim 4; and
   a driving device configured to generate a driving force.

6. The force detecting device according to claim 1, further comprising a motor including a rotatable shaft having an encoder, wherein the wave generator is attached to and rotatable with the shaft.

7. A robot comprising:
   the force detecting device according to claim 6; and
   a driving device configured to generate a driving force.

8. The force detecting device according to claim 1, further comprising a fixing member that fixes the first member and the second member to each other in a state in which the piezoelectric element is sandwiched and pressurized by the first member and the second member.

9. A robot comprising:
   the force detecting device according to claim 8; and
   a driving device configured to generate a driving force.

10. The force detecting device according to claim 1, wherein the force detecting device includes a plurality of the piezoelectric elements disposed between the first member and the second member and configured to output a signal according to an external force.

11. A robot comprising:
the force detecting device according to claim 10; and
a driving device configured to generate a driving force.

12. A driving unit comprising:
the force detecting device according to claim 1; and
a driving device configured to generate a driving force to the reduction gear.

13. A robot comprising:
the force detecting device according to claim 1; and
a driving device configured to generate a driving force.

14. The robot according to claim 13, further comprising:
a third member configured to support the driving device; and
a fourth member capable of turning with respect to the third member, wherein the second member configures a part of the fourth member.

\* \* \* \* \*